UNITED STATES PATENT OFFICE.

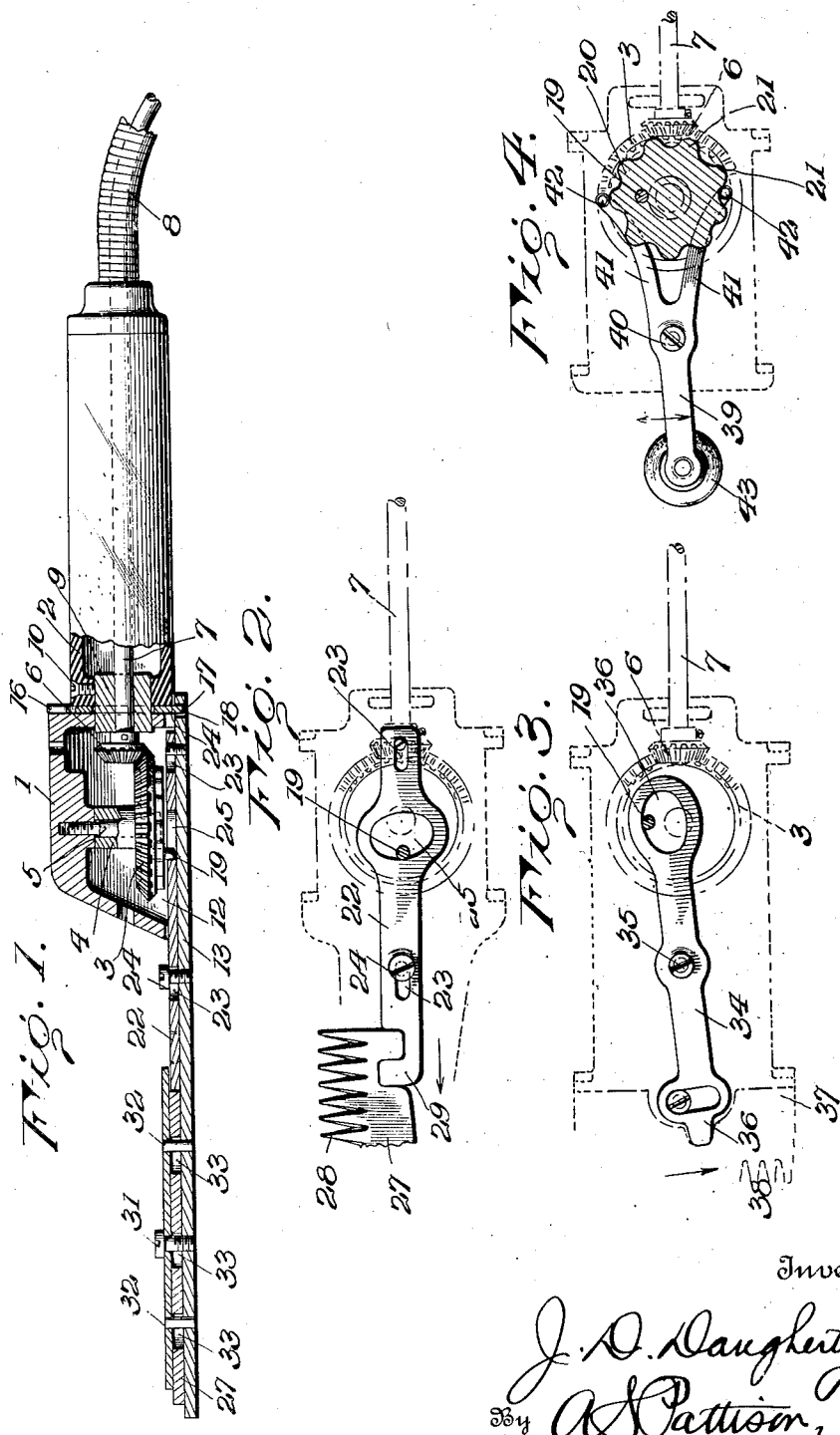

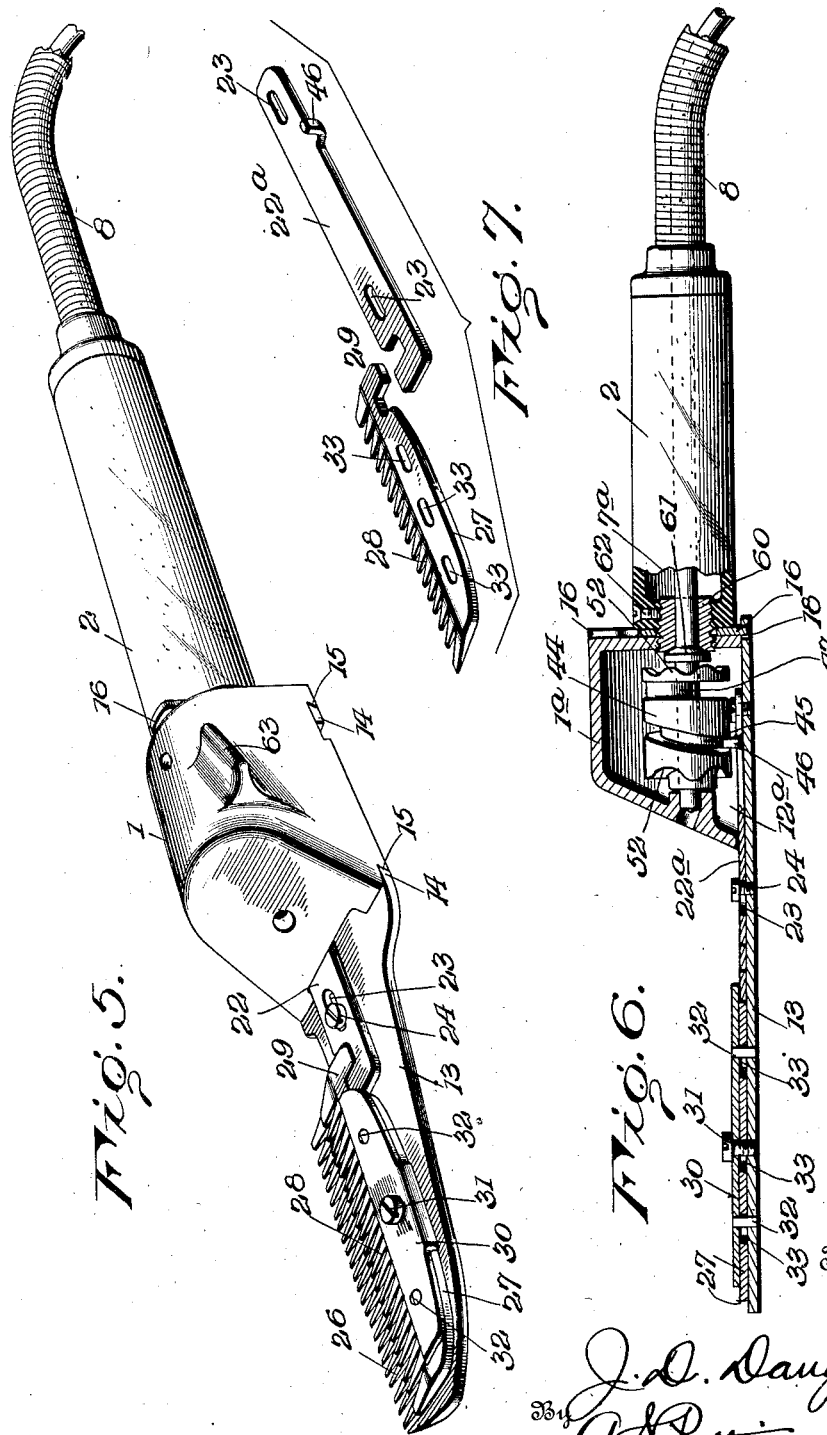

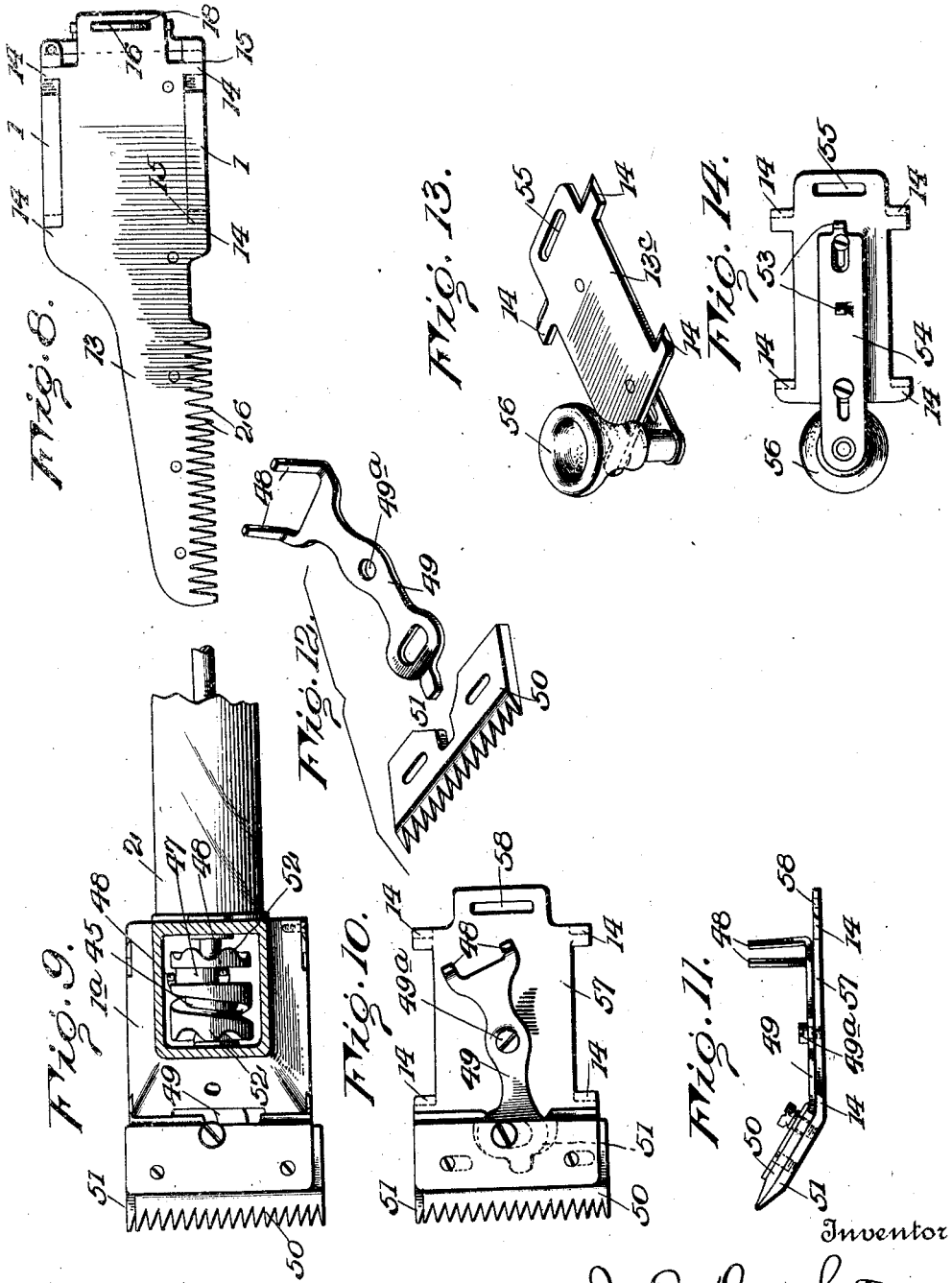

JAMES DENNY DAUGHERTY, OF KITTANNING, PENNSYLVANIA.

COMBINED CLIPPER AND VIBRATOR.

1,357,031.        Specification of Letters Patent.    Patented Oct. 26, 1920.

Application filed November 26, 1918. Serial No. 264,156.

*To all whom it may concern:*

Be it known that I, JAMES DENNY DAUGHERTY, a citizen of the United States, residing at Kittanning, in the county of Armstrong and State of Pennsylvania, have invented certain new and useful Improvements in Combined Clippers and Vibrators, of which the following is a specification, reference being had therein to the accompanying drawing.

This invention relates to improvements in combined clippers and vibrators, and is more particularly intended for the use of barbers, where both clippers and vibrators are almost universally in use.

The primary object of my invention is to provide a hand implement containing a mechanism so constructed that either a clipper attachment or a vibrator attachment may be applied thereto and operated by it, thus avoiding the necessity of having separate implements and separate operating mechanisms for the two devices, as is now required.

In the accompanying drawings—

Figure 1 is a longitudinal sectional view of an implement embodying my invention, and showing one form of clipper attachment applied thereto.

Fig. 2 is a detached plan view of a part of the clipper attachment shown in Fig. 1.

Fig. 3 is a detached plan view of another form of clipper attachment adapted to be applied to and operated by the mechanism of the hand implement.

Fig. 4 is a plan view of a vibrator attachment for the hand implement.

Fig. 5 is a perspective view of the implement complete, showing one form of clipper attachment applied thereto.

Fig. 6 is a longitudinal sectional view showing a modified form of mechanism for operating either the clipper or vibrator attachment.

Fig. 7 is a detached perspective view of a part of the clipper attachment, shown in Fig. 6.

Fig. 8 is a bottom plan view of the lower part of the clipper attachment and applied to the housing of the hand implement.

Fig. 9 is a top plan view partly in section, showing the ordinary form of clipper attachment used by barbers, constructed to be applied to my device.

Fig. 10 is a detached top plan view of the clipper attachment shown in Fig. 9.

Fig. 11 is a detached edge elevation of Fig. 10.

Fig. 12 is a detached perspective view of the movable parts of the clipper attachment, shown in Figs. 9, 10 and 11.

Fig. 13 is an inverted perspective view of a modified form of vibrator attachment.

Fig. 14 is a top plan view of the vibrator attachment, shown in Fig. 13.

It is well known that barbers use a hair clipper and a vibrator or mechanical massage implement, and that these two implements are separate and distinct.

It is also well known that the clippers in use are hand operated, and that the vibrators in use are electrically operated through a suitable mechanical mechanism. Therefore, separate instruments are required for the two devices as they are now used by barbers.

My improvement is to provide an implement which is mechanically operated by an electrical motor or otherwise, which is so constructed that separate and different forms of clipping mechanisms and a vibrator may be alternately applied to the device, thereby embodying in one implement different forms of clipping mechanisms and a vibrator.

This is accomplished by providing a device adapted to be held in the hand of the operator, and containing a mechanism so constructed that either a clipper attachment or a vibrator attachment may be alternately applied thereto.

In Figs. 1, 2, 3, 4 and 5, I show the preferred form of my combined clipper and vibrator. In this preferred form a housing 1 is provided from which projects a hollow handle 2. This handle 2 is either made as a part of the housing 1, or attached thereto in any suitable manner. Suitably journaled in this housing is a gear wheed 3, and in the construction here shown, this gear wheel has an elongated hub 4 that is journaled on a suitable bearing 5, screwed into the top of the housing 1 from the inner side thereof.

The operating mechanism for the beveled gear wheel 3, comprises a beveled pinion 6, which is attached to the inner end of an operating shaft 7. This shaft 7 projects from the handle 2, and will be connected with any suitable motor (not shown) preferably the electrical motor which is now used for operating the vibrators in barber shops, by means of a suitable flexible connection 8. The inner end of the shaft 7 passes through a bearing block 9 that is held in the handle by a clamping screw 10.

Normally the bottom of the housing 1 is open to receive either a clipper or vibrator attachment. The attachment consists in either case of an attachment-plate 13, which is applied to the open bottom 12 of the housing 1. The plate may be detachably attached to the housing in any suitable manner without departing from or in any way affecting my improvement. For purposes of illustration I here show the attaching means as comprising four laterally projecting lugs 14, which are made wedge-shaped and adapted to interlock with notches 15 having corresponding wedge-shaped walls, and a cam plate 16 which is located between the inner end of the handle 2 and the housing 1. By turning this cam plate 16, its lower edge 17 will interlock with the slot 18 holding it in its proper position on the housing, thus making a very convenient and quickly operated means of attaching and detaching the attachment plate 13.

There will be a separate attachment plate for and carrying each respective form of clipper, and a separate attachment plate for and carrying the vibrator. By reason of these two constructions, the operator selects the form of clipper he wants to use and attaches it to the device, or if he wants to use a vibrator, the attachment plate carrying the vibrator is selected and is attached to the device.

In Figs. 1, 2, 5 and 6, I have shown a form of clipper attachment which is so constructed that it is adapted to be used as an ordinary pair of scissors in cutting hair by letting it rest on the comb, or independent of the comb. It is well-known that barbers in trimming hair use a comb to lift it up and then cut the projecting hair with scissors. The clipper construction shown in Figs. 1, 2, 5 and 6 is intended to take the place of the ordinary scissors in connection with the comb for cutting or trimming hair.

In the preferred forms shown in Figs. 1 to 5, inclusive, the gear wheel 3 is provided with an eccentrically arranged pin 19 and with a concentrically arranged plate 20, carrying a plurality of cams 21, which form what might be termed a fluted edge. The eccentrically arranged pin 19 coöperates with the clippers to cause a vibration of one set of the teeth of the clipper, and the fluted plate 20 operates the vibrator to give it a very rapid vibration.

In the preferred form shown in Figs. 1, 2 and 5, inclusive, the attachment plate carries a longitudinally movable member 22, which is provided with the longitudinal slots 23 through which suitable guiding screws 24 pass into the plate 13. This member 22 has a slot 25 which is elongated in a direction crosswise the member and into this slot the externally arranged pin 19 passes. By this arrangement when the attachment plate 13, of Figs. 1 and 2, is applied to the housing 1, the rotating gear and the pin 19 carried thereby will cause the member 22 to have a longitudinal reciprocating movement. In the form shown in Figs. 1, 2 and 5, the attachment plate 13 carries on one edge a plurality of teeth 26, similar to a comb, and on top of the plate 13 is a toothed member 27, carrying cutter teeth 28 adapted to coöperate with the teeth 26, so that when the member 27 is reciprocated by the member 22, which interlocks therewith as shown at 29, it has a shearing action for cutting hair that may project between the teeth 26 and 28. As here shown, a plate 30 is placed outside of the toothed member 27 and is held in place on the plate 13 by a screw 31 and pins 32, which pass through slots 33 in the member 27.

In the construction shown in Figs. 1 to 5, the clipping members extend in a direction longitudinal the implement and reciprocate longitudinal of the implement so that it is adapted to be used for cutting hair as ordinary scissors either with or without a comb.

In Fig. 3, I show a clipper arrangement in which the clipper reciprocates transverse the device and will extend upward at an angle, as shown in Fig. 11, like the ordinary clippers now in use by barbers. In this instance, the attachment plate 13ª carries a lever 34 intermediately pivoted at 35 on the attachment plate, and this lever has its inner end provided with an opening 36, which is elongated in a longitudinal direction and receives the eccentrically arranged pin 19 of the gear wheel 3. By this arrangement when the gear wheel 3 is rotated, the lever 34 is rocked on its pivot 35 and its outer end 36 rockably interlocks with a reciprocating toothed member 37 of the clipper, which coacts with the upturned toothed clipper 38 of the attachment plate 13ª.

In Fig. 4, I have shown the attachment plate carrying a vibrator member. In this instance, the attachment plate 13ᵇ carries a lever 39 which is intermediately pivoted at 40 on the said plate. The inner end of the lever 40 is bifurcated and has its ends 41 provided with rollers 42, adapted to engage the cams or fluted portion 21 of the plate 20. The cams or flutes are so arranged that when one of the rollers 42 is moved outward by the cam, the other roller is in the space between two cams, as shown in Fig. 4. By reason of this construction, the lever 39 is given a plurality of reciprocations for each revolution of the gear wheel 3, and as a consequence the massage member 43 at the end of the lever is given a corresponding rapid vibration.

From the foregoing it will be seen that my improved implement carries a mechanism so constructed as to give different kinds of vibrations combined with attachment plates, each carrying a different kind of reciprocating mechanism. The barber selects the attachment plate carrying the form of implement he desires to use and attaches it to the open face of the housing, instead of having separate operating mechanisms for each implement as heretofore. Further than that the clippers are mechanically operated as well as the vibrator, and it avoids the expense and necessity of having mechanically operating mechanisms for each implement.

Referring now to Figs. 7 to 14, inclusive, which shows a modified form of carrying out my improvement, the housing 1ª has the open face 12ª as in the other form. The attachment plate 13ª is the same as in the figures already described, and the coöperating members 27 and 30 are the same.

The modified form primarily consists in having the shaft 7ª carry a cam member 44, instead of a gear wheel. This cam member 44 has a cam groove 45 into which a pin 46 projects from the reciprocating member 22ª, for imparting to the said member 22ª a reciprocating movement, which is conveyed to the toothed member.

This member 44 is provided also with a transversely arranged cam surface 47 that rests between the arms 48 at the inner end of the reciprocating member 49 of the form of clipper shown in Figs. 9, 10, 11 and 12. In this form the inner end of the member 49 interlocks with the toothed member 50 in the same way as in Fig. 3, as shown at 51, and need not be more fully described. The toothed member 50 coöperates with the toothed member 51 and constitutes the usual type of clipper in common use.

The cam member 44 has its ends fluted, as shown at 52, which act upon pins 53 which project from the vibrator plate 54, so that the rotation of the cam member gives a plurality of vibrations to the plate 54 for each revolution of the cam member. This vibrator plate 54 is carried by an attachment plate 13ᶜ which has the same form of projections 14 as the attachment plate 13, and is attached to the open end of the housing 1, in the same manner as the plate 13, and it also has a slot 55 to receive the locking member 16. The outer end of the vibrator plate 54 carries a suitable massage device 56.

The form of clipper, shown in Figs. 9, 10, 11 and 12, is carried on an attachment plate 57, which has the same form of interlocking projections 14, as the attachment plate 13, and it also has a slot 58 with which the locking cam 16 interlocks the same as described in respect to the attachment plate 13.

Referring to Fig. 6, I provide an adjustable bushing 60, at the juncture of the handle 2, and the housing 1ª to adjust against a cone-shaped flange 61 on the shaft 7ª for the purpose of taking up any wear or lost motion endwise on the shaft and to hold it against endwise movement on the housing. This bushing is held in its adjusted position by a suitable screw 62.

The housing 1 will be provided with suitably arranged projections 63, at opposite sides thereof for the thumb and forefinger of the hand of the operator. It is intended that the operator should grasp the housing 1, with the thumb and forefinger and the handle 2 with the palm of the hand and the three other fingers, when operating the device.

From the foregoing it will be observed that my improvement involves a hand member or housing carrying a clipper operating mechanism, and a vibrator operating mechanism both common to an operating element or mechanism within the housing, whereby there are a plurality of mechanisms adapted to coöperate successively with a plurality of detachable plates each carrying a different mechanism.

My improvement as I perceive it is the provision of a device of the character described having a housing carrying an operating member and a plurality of members common thereto, and the members adapted to be separately attached to the housing and operated by one of the mechanisms and carrying the desired tonsorial implement.

Having thus described my invention, what I claim and desire to secure by Letters Patent is—

1. A device of the character described, comprising a housing carrying an operating member therein, a plurality of mechanisms common to the operating member, and a member attachable to and detachable from the housing and carrying a tonsorial implement and means operatively connecting the implement with its corresponding mechanism within the housing.

2. A device of the character described, comprising a housing, having an open side, an operating mechanism within the housing, a plate attachable to and detachable from the open end of the housing and carrying a projecting tonsorial implement operatively connected with the mechanism within the housing.

3. In a device of the character described, the combination with a housing having an open side, and a plurality of mechanisms within the housing, of a plurality of plates adapted to be separately attached to and detachable from the open side of the housing, each plate projecting and carrying a different kind of tonsorial implement, and a mechanism fitting and coöperating with its particular mechanism within the housing.

4. In a device of the character described, the combination with a housing carrying a clipper mechanism and a vibrator mechanism, of an attachable and detachable plate carrying a clipper mechanism coöperating with the clipper mechanism of the housing, and a plate separately attachable to the housing and carrying a vibrator mechanism coöperating with the vibrator mechanism of the housing.

5. In a device of the character described, the combination with a housing carrying a simultaneously operating clipper and vibrating mechanisms, of separate attachable and detachable plates adapted to be separately attached to the housing, one plate carrying a clipper mechanism adapted to coöperate with the clipper mechanism of the housing when it is applied thereto, and the other plate carrying a vibrator mechanism adapted to coöperate with the vibrator mechanism of the housing when it is substituted for the clipper plate.

6. A device of the character described, comprising a housing carrying a gear wheel, the gear wheel carrying an eccentrically arranged projecting pin and a concentrically arranged fluted plate, the pin adapted to operate one kind of tonsorial implement and the fluted plate another kind of tonsorial implement and plates attachable to the housing, one plate carrying a mechanism coöperating with the pin when applied, and the other plate carrying a mechanism coöperating with the fluted plate when it is applied to the housing.

In testimony whereof I hereunto affix my signature.

JAMES DENNY DAUGHERTY.